US012597406B2

(12) United States Patent
Khalid et al.

(10) Patent No.: US 12,597,406 B2
(45) Date of Patent: Apr. 7, 2026

(54) ELECTRONIC CYMBAL AND STRIKING DETECTION METHOD

(71) Applicant: Roland Corporation, Shizuoka (JP)

(72) Inventors: Suhada Binti Khalid, W.P. Kuala Lumpur (MY); Nuradiza Binti Rani, W.P. Kuala Lumpur (MY); Syota Kobayashi, Shizuoka (JP)

(73) Assignee: Roland Corporation, Shizuoka (JP)

( * ) Notice: Subject to any disclaimer, the term of this patent is extended or adjusted under 35 U.S.C. 154(b) by 827 days.

(21) Appl. No.: 17/866,540

(22) Filed: Jul. 17, 2022

(65) Prior Publication Data

US 2023/0317042 A1 Oct. 5, 2023

(30) Foreign Application Priority Data

Mar. 29, 2022 (JP) ................................ 2022-054432

(51) Int. Cl.
*G10H 3/14* (2006.01)

(52) U.S. Cl.
CPC .................................. *G10H 3/146* (2013.01)

(58) Field of Classification Search
CPC ..................................................... G10H 3/146
USPC ........................................................... 84/723
See application file for complete search history.

(56) References Cited

U.S. PATENT DOCUMENTS 6,632,989 B2 10/2003 Yoshino et al.
6,881,885 B2 4/2005 Yoshino et al.
7,473,834 B2 1/2009 Yoshino
10,657,944 B2 5/2020 Steinhauser
2005/0145101 A1* 7/2005 Yoshino .................. G10H 1/32 84/723
2021/0035542 A1* 2/2021 Kobayashi ........... G10H 1/0008
2021/0035543 A1 2/2021 Kobayashi
2022/0044664 A1 2/2022 Mori

FOREIGN PATENT DOCUMENTS

CN 202258288 5/2012
CN 204315222 5/2015
JP H0635450 2/1994
JP 2009145559 7/2009
(Continued)

OTHER PUBLICATIONS

"Partial Supplementary European Search Report of Europe Counterpart Application", issued on Jun. 19, 2023, p. 1-p. 12.
(Continued)

*Primary Examiner* — Dedei K Hammond
*Assistant Examiner* — Philip G Scoles
(74) *Attorney, Agent, or Firm* — JCIPRNET

(57) ABSTRACT

By limiting deformation of an upper cover part 41 toward an inner peripheral side through catching between an outer peripheral surface of a bent part 21*b* and a stopper 46 or by forming an interval between a sensor installation part 21*d* and the upper cover part 41 to gradually increase from the inner peripheral side toward an outer peripheral side, at the time of being struck from a lateral direction, the upper cover part 41 and the lateral cover part 42 are suppressed from contacting an outer edge of the sensor installation part 21*d*. Thus, since the protrusion 45 is easily pressed to the edge sensor 5, the sensitivity of the edge sensor 5 with respect to the striking from the lateral direction can be facilitated.

20 Claims, 4 Drawing Sheets

(56) References Cited

FOREIGN PATENT DOCUMENTS

| | | | | |
|---|---|---|---|---|
| JP | 2013015852 | | | 1/2013 |
| JP | 2019113667 | | | 7/2019 |
| JP | 2019113824 | A | * | 7/2019 |
| JP | 2021026077 | | | 2/2021 |
| WO | 2019176127 | | | 9/2019 |

OTHER PUBLICATIONS

"Search Report of Europe Counterpart Application", issued on Sep. 22, 2023, pp. 1-14.

"Office Action of Europe Counterpart Application", issued on Apr. 23, 2024, pp. 1-6.

* cited by examiner (a)

(b)

(a)

(b)

ELECTRONIC CYMBAL AND STRIKING DETECTION METHOD

CROSS-REFERENCE TO RELATED APPLICATION

This application claims the priority benefit of Japan application serial no. 2022-054432 filed on Mar. 29, 2022. The entirety of the above-mentioned patent application is hereby incorporated by reference herein and made a part of this specification.

BACKGROUND

Technical Field

The invention relates to an electronic cymbal and a striking detection method, and particularly relates to an electronic cymbal and a striking detection method capable of facilitating the sensor sensitivity with respect to striking from a lateral direction.

Description of Related Art

An electronic cymbal including a frame, an edge sensor installed to an upper surface on an outer edge side of the frame, and a cover covering an upper surface of the frame in a state in which a space is formed between the edge sensor and the cover and detecting striking to an outer edge portion of the cover (frame) by the edge sensor is known.

For example, Patent Document 1 recites an electronic cymbal including an upper cover part **5*b*1 covering an upper surface of a frame 4 and a lower cover part 5*b*2 with coverage from an outer edge (outer peripheral surface) of the frame 4 to an edge part of a lower surface. In such technique, a protrusion part 5*b*3 protruding toward an edge sensor 7*b* is formed in the upper cover part 5*b*1, and when the performer strikes an outer edge portion of the upper cover part 5*b*1 from the top by a stick, etc., due to elastic deformation (bending) of the upper cover part 5*b*1, the protrusion part 5*b*3 is pressed to the edge sensor 7*b*. Accordingly, the striking to the outer edge portion of the cover 5 (the frame 4) is detected by the edge sensor 7*b***.

PRIOR ART DOCUMENT

Patent Document

[Patent Document 1] Japanese Laid-open No. 2021-026077 (e.g., para. 0040, 0041, FIG. 4)

However, in the conventional technology, when the outer edge portion of the cover 5 is struck in a state in which the stick is upright (referred to striking from the lateral direction), before the protrusion part **5*b*3 is pressed to the edge sensor 7*b*, the upper cover 5*b*1 or the lower cover part 5*b*2 may contact the outer edge of the frame 4. When such contact occurs, since the pressing of the edge sensor 7*b* due to the protrusion part 5*b*3 is insufficient, an issue that the sensitivity of the edge sensor 7*b*** with respect to the striking from the lateral direction may be low arises.

SUMMARY

An electronic cymbal according to an aspect of the invention includes: a plate-like frame; a sensor installed to an upper surface on an outer edge side of the frame; and a cover covering upper surfaces of the sensor and the frame.

The cover includes an upper cover part covering the upper surface of the frame in a state in which a space is formed between the upper cover part and the sensor; a lateral cover part extending from an outer edge of the upper cover part and covering an outer peripheral surface of the frame in a state in which a space is formed between the lateral cover part and an outer peripheral surface of the frame; and a lower cover part, extending from a lower end of the lateral cover part to an inner peripheral side and covering a lower surface of the frame. The upper cover part or the frame comprises a stopper facing the space between the upper cover part and the sensor and limits deformation of the upper cover part toward an inner peripheral side.

An electronic cymbal according to another aspect of the invention includes: a plate-like frame; a sensor installed to an upper surface on an outer edge side of the frame; and a cover covering upper surfaces of the sensor and the frame. The cover includes an upper cover part covering the upper surface of the frame in a state in which a space is formed between the upper cover part and the sensor; a lateral cover part extending from an outer edge of the upper cover part and covering an outer peripheral surface of the frame in a state in which a space is formed between the lateral cover part and an outer peripheral surface of the frame; and a lower cover part, extending from a lower end of the lateral cover part to an inner peripheral side and covering a lower surface of the frame. The frame includes: a covered part covered in a state of being contacted by the upper cover part; and a sensor installation part which is located on an outer peripheral side with respect to the covered part and to which the sensor is installed. The upper cover part includes a protrusion which protrudes toward the sensor and in which a lower surface is parallel to an upper surface of the sensor installation part. The upper surface of the sensor installation part tilts downward toward an outer peripheral side at a slope greater than that of an upper surface of the covered part, and an interval between the upper surface of the sensor installation part and the lower surface of the upper cover part is formed to gradually increase from an inner peripheral side toward the outer peripheral side.

Another aspect of the invention provides a striking detection method for an electronic cymbal. The electronic cymbal includes: a plate-like frame; a sensor installed to an upper surface on an outer edge side of the frame; and a cover covering upper surfaces of the sensor and the frame. The cover includes: an upper cover part covering the upper surface of the frame in a state in which a space is formed between the upper cover part and the sensor; a lateral cover part extending from an outer edge of the upper cover part and covering an outer peripheral surface of the frame in a state in which a space is formed between the lateral cover part and an outer peripheral surface of the frame; and a lower cover part, extending from a lower end of the lateral cover part to an inner peripheral side and covering a lower surface of the frame. The upper cover part or the frame includes a stopper facing the space between the upper cover part and the sensor. The striking detection method includes: at the time of striking an outer edge of the cover, limiting deformation of the upper cover part toward an inner peripheral side by the stopper and detecting striking to the cover by pressing the sensor by the upper cover part deformed with the stopper as a fulcrum.

Another aspect of the invention provides a striking detection method for an electronic cymbal. The electronic cymbal includes: a plate-like frame; a sensor installed to an upper surface on an outer edge side of the frame; and a cover covering upper surfaces of the sensor and the frame. The cover includes: an upper cover part covering the upper surface of the frame in a state in which a space is formed between the upper cover part and the sensor; a lateral cover part extending from an outer edge of the upper cover part and covering an outer peripheral surface of the frame in a state in which a space is formed between the lateral cover part and an outer peripheral surface of the frame; and a lower cover part, extending from a lower end of the lateral cover part to an inner peripheral side and covering a lower surface of the frame. The frame includes: a covered part covered in a state of being contacted by the upper cover part; and a sensor installation part which is located on an outer peripheral side with respect to the covered part and to which the sensor is installed. The upper cover part includes a protrusion which protrudes toward the sensor and in which a lower surface is parallel to an upper surface of the sensor installation part. The upper surface of the sensor installation part tilts downward toward an outer peripheral side at a slope greater than that of an upper surface of the covered part, and an interval between the upper surface of the sensor installation part and the lower surface of the upper cover part is formed to gradually increase toward the outer peripheral side. The striking detection method includes: at the time of striking the outside of the cover, suppressing the upper cover part and the lateral cover part from contacting an outer edge of the sensor installation part, and detecting striking to the cover by pressing the sensor by the protrusion displaced together with deformation of the upper cover part.

DESCRIPTION OF THE EMBODIMENTS

The invention provides an electronic cymbal and a striking detection method capable of facilitating the sensor sensitivity with respect to the striking from the lateral direction.

Figure 1:
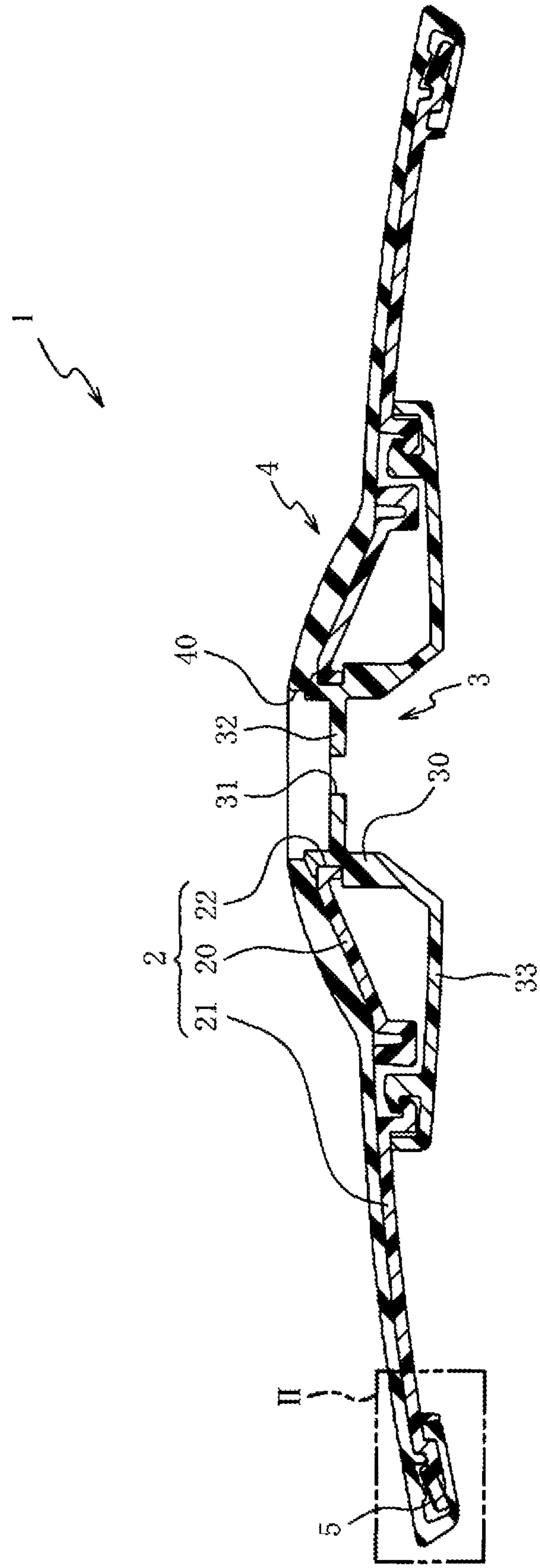
FIG. 1 is a cross-sectional view illustrating an electronic cymbal according to a first embodiment.

Hereinafter, several embodiments will be described with reference to the accompanying drawings. Firstly, the overall configuration of an electronic cymbal 1 is described with reference to FIG. 1. FIG. 1 is a cross-sectional view illustrating an electronic cymbal 1 according to a first embodiment. FIG. 1 illustrates an end surface cut at a plane along a central axis of a frame 2 that is disc-shaped (the same applies to FIG. 2 and subsequent drawings). In addition, in the following description, the description is made by setting the direction along the central axis of the disc-shaped frame 2 as upper-lower direction and a direction (radial direction) orthogonal to the upper-lower direction as a left-right direction.

As shown in FIG. 1, the electronic cymbal 1 is an electronic percussion instrument that simulates an acoustic cymbal (referred to as "cymbal" in the following). The skeleton of the electronic cymbal 1 is formed by the frame 2.

The frame 2 is a frame made of resin and including a bell frame 20 that simulates the shape of a bell of the cymbal and a bow frame 21 that simulates the shape of a bow of the cymbal. The bell frame 20 is formed in a bowl shape tilting downward from the central side thereof toward the outer peripheral side, and the bow frame 21 extends from the outer edge of the bell frame 20 toward the outer peripheral side (the outer side in the left-right direction).

The bow frame 21 gradually tilts downward with respect to the bell frame 20 toward the outer peripheral side, and the frame 2 as a whole is formed in a substantially disc shape by integrally forming the bell frame 20 and the bow frame 21.

A through hole 22 is formed at the center of the bell frame 20, and an inner wall part 30 of a case 3 is caught to the through hole 22. The inner wall part 30 is formed in a substantially cylindrical shape, and the inner peripheral side of the inner wall part 30 (the inner side in the left-right direction) is blocked by a disc-shaped support part 32 having a through hole 31 at the center. A rod (not shown) for supporting the electronic cymbal 1 is inserted into the through hole 31 of the support part 32.

A bottom wall part 33 extends from the lower end of the inner wall part 30 toward the outer peripheral side. By fixing the outer edge of the bottom wall part 33 to the lower surface of the frame 2 (the bow frame 21), a space surrounded by the frame 2 and the case 3 is formed on the lower surface side of the frame 2. Electronic components, such as a striking sensor (not shown), a substrate (not shown) etc., installed to the lower surface of the bell frame 20 is stored in the space. The striking sensor is a piezoelectric element detecting the vibration of the frame 2.

The upper surface of each of the bell frame 20 and the bow frame 21 is covered by a cover 4 made of rubber and having a through hole 40 at the center, and the cover 4 is formed in a shape (substantially disc shape) along each of the frames 20 and 21. A bell part sensor not shown herein is provided between the cover 4 and the bell frame 20, and the bell part sensor is a pressure sensor (e.g., a membrane switch) that is sheet-like and is ON/OFF when the cover 4 covering the bell frame 20 is struck.

The striking to the bell frame 20 is detected by the bell part sensor, and the striking to the bow frame 21 is detected by the striking sensor. In addition, as will be explicated in the following, the striking to the edge (outer edge) portion of the bow frame 21 is detected by an edge sensor 5. The striking detected by each sensor is converted into an electrical signal and output to a sound source device not shown herein. Accordingly, a musical sound in accordance with a striking position to the electronic cymbal 1 is generated.

Figure 2:
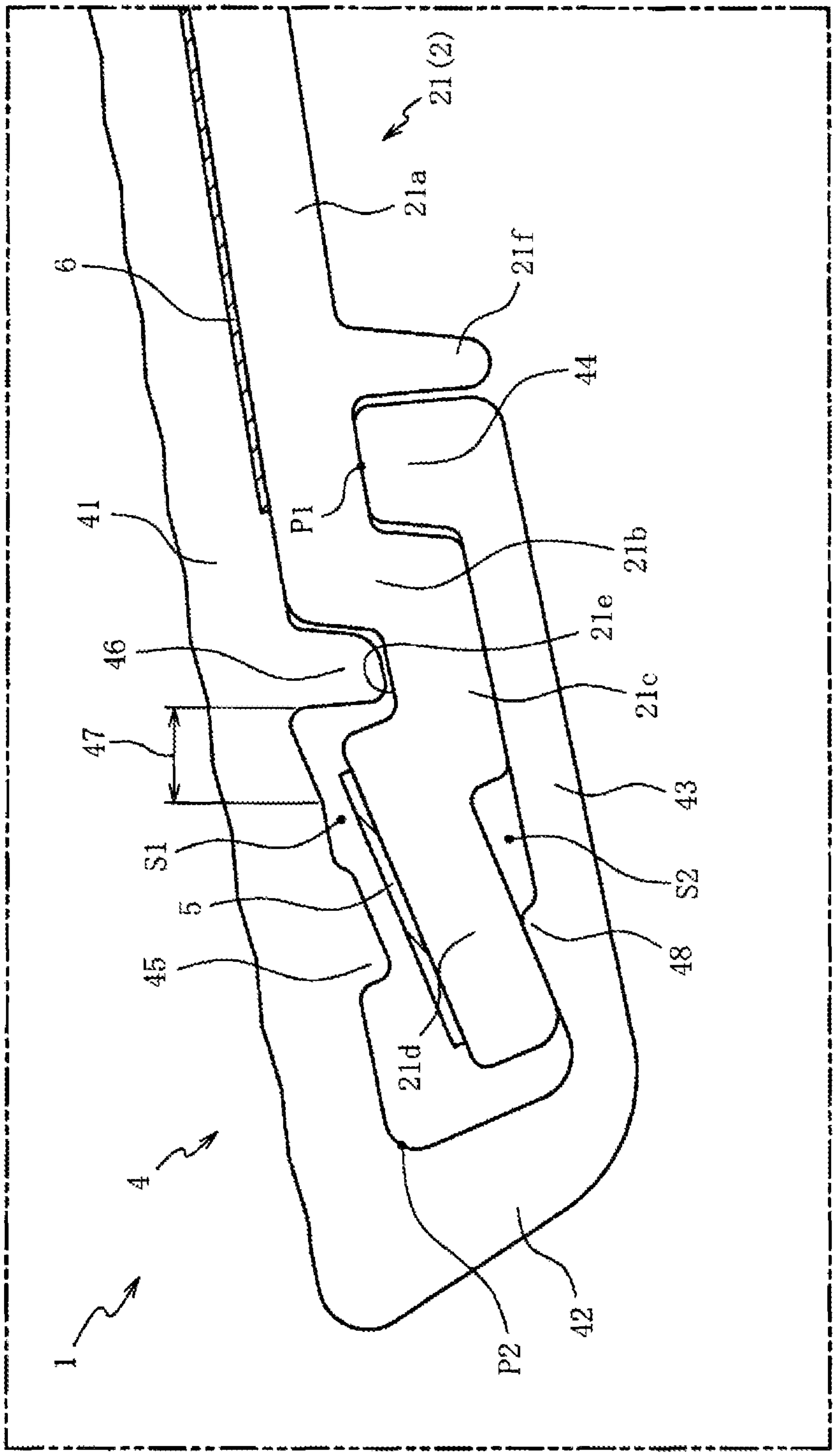
FIG. 2 is a partially enlarged cross-sectional view of the electronic cymbal in which a portion II of FIG. 1 is enlarged.
Figure 3:
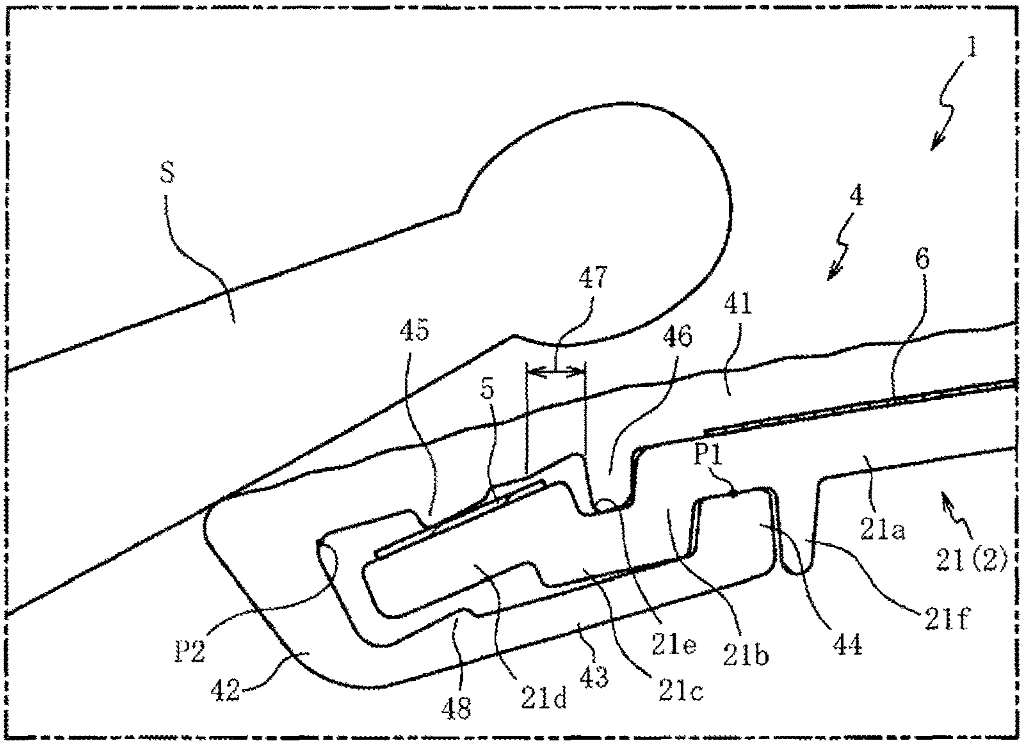
In FIG. 3, (a) is a partially enlarged cross-sectional view of the electronic cymbal illustrating a state in which an edge portion is struck by normal striking, and (b) is a partially enlarged cross-sectional view of the electronic cymbal illustrating a state in which the edge portion is struck by striking from a lateral direction.
Figure 3:
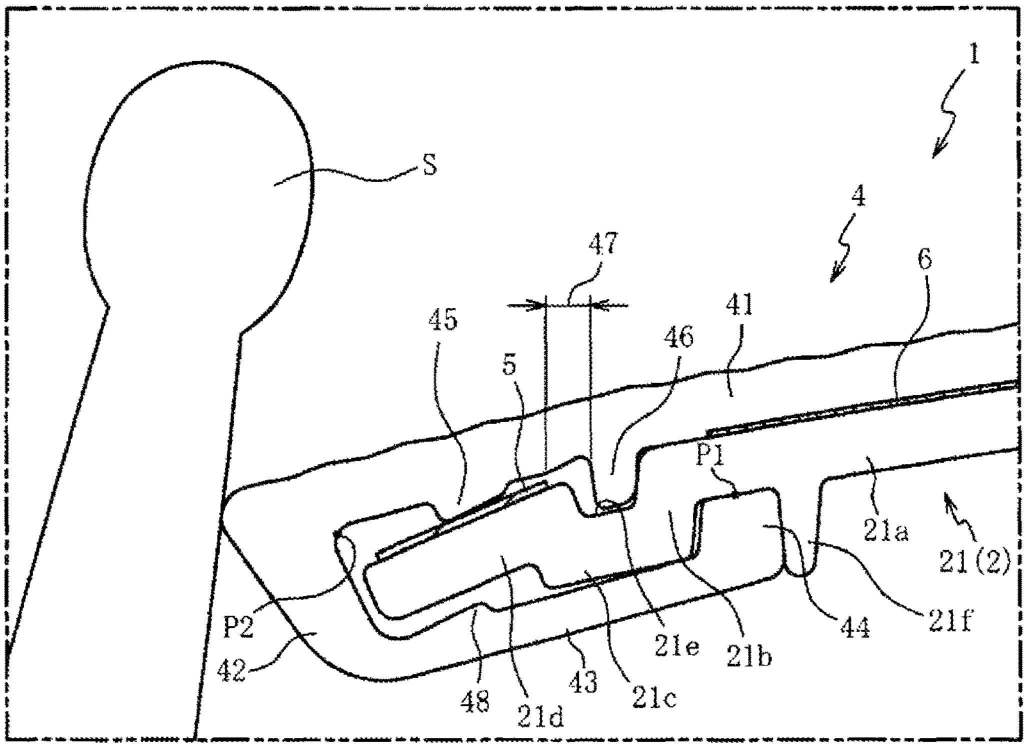

Then, referring to FIG. 2 and (a) and (b) of FIG. 3, the detailed configuration of the edge portion of the electronic cymbal 1 and the function at the time when the edge portion is struck are described.

FIG. 2 is a partially enlarged cross-sectional view of the electronic cymbal 1 in which a portion II of FIG. 1 is enlarged. In FIG. 3, (a) is a partially enlarged cross-sectional view of the electronic cymbal 1 illustrating a state in which an edge portion is struck by normal striking, and (b) is a partially enlarged cross-sectional view of the electronic cymbal 1 illustrating a state in which the edge portion is struck by striking from a lateral direction. In FIG. 2 and (a) and (b) of FIG. 3, in order to simplify the drawings, the hatching of the frame 2 (the bow frame 21) and the cover 4 is omitted.

In addition, normal striking refers to striking to the outer edge of an upper cover part 41 from the top in a state in which a stick S is slanted (at an angle close to being horizontal), and striking from the lateral direction refers to striking to the outer edge portion of the upper cover part 41 from the lateral direction in a state in which the stick S is upright (at an angle close to the vertical direction). In addition, each configuration of the electronic cymbal 1 described in the following is formed to be continuous in the peripheral direction. However, a portion of the configuration may also be intermittent in the peripheral direction.

As shown in FIG. 2, the cover 4 includes the upper cover part 41 covering the upper surface side of the bow frame 21, a lateral cover part 42 extending downward from the outer edge (the end part on the left side of FIG. 2) of the upper cover part 41, a lower cover part 43 extending from the lower end of the lateral cover part 42 toward the inner peripheral side (the right side of FIG. 2), and a bonding part 44 bent upward from the inner edge of the lower cover part 43. The parts 41 to 44 are integrally formed.

The upper cover part 41 is bonded to the upper surface of the bow frame 21 by a double-side tape 6, and the upper surface of the bonding part 44 is bonded to the lower surface of the bow frame 21 by an adhesive. Meanwhile, on the outer peripheral side with respect to these bonded portions, neither of the upper cover part 41, the lateral cover part 42, and the lower cover part 43 is bonded to the bow frame 21.

As described in the following, within the bow frame 21, a portion bonded to the upper cover part 41 (i.e., a portion covered in a state of being contacted by the upper cover part 41) is described as a covered part 21*a*.

A bent part 21*b* is bent downward from the outer edge of the covered part 21*a*, an overhang part 21*c* overhangs from the lower end of the bent part 21*b* toward the outer peripheral side. In addition, a sensor installation part 21*d* extends from the upper end on the outer edge side of the overhang part 21*c* to the outer peripheral side. By integrally forming the respective parts of the covered part 21*a*, the bent part 21*b*, the overhang part 21*c*, and the sensor installation part 21*d*, the edge portion of the bow frame 21 is formed.

The edge sensor 5 is bonded to the upper surface of the sensor installation part 21*d*, and the edge sensor 5 is also a sheet-like pressure sensor (e.g., a membrane switch) like the bell part sensor. The upper cover part 41 covers the bow frame 21 in a state in which a space S1 is formed between the upper cover part 41 and the edge sensor 5 (the sensor installation part 21*d*).

A protrusion 45 protruding toward the edge sensor 5 (downward) is integrally formed on the lower surface of the upper cover part 41. The protrusion 45 is a portion pressing the edge sensor 5 at the time when the outer edge portion of the upper cover part 41 is struck.

A stopper 46 integrally formed with the upper cover part 41 is provided on the inner peripheral side with respect to the protrusion 45. The stopper 46 is a protrusion protruding downward from the upper cover part 41 and inserted into a recess part 21*e* formed on the upper surface of the bow frame 21. The recess part 21*e* is a groove formed by the bent part 21*b*, the overhang part 21*c*, and the sensor installation part 21*d* of the bow frame 21.

In a state before the upper cover part 41 is struck (referred to as "pre-striking state" in the following), the stopper 46 and the bottom surface of the recess part 21*e* are in contact with each other or slightly separated (less than a gap between the protrusion 45 and the edge sensor 5).

Accordingly, as shown in (a) of FIG. 3, when the outer edge portion of the upper cover part 41 is struck from the top through normal striking, the stopper 46 contacting the bottom surface of the recess part 21*e* (the upper surface of the overhang part 21*c*) serves as the fulcrum, and the upper cover part 41 is elastically deformed to be bent downward.

As the upper cover part 41 deforms downward, the lateral cover part 42 and the lower cover part 43 deform downward so as to be separated from the bow frame 21 (the overhang part 21*c* and the sensor installation part 21*d*). This is because, as described above, the lateral cover part 42 and the lower cover part 43 are not bonded to the bow frame 21 on the outer peripheral side with respect to the bonding part 44.

Through the downward deformation of the respective cover parts 41, 42, and 43, the protrusion 45 is pressed to the edge sensor 5, and the striking to the cover 4 (the upper cover part 41) by the stick S is detected by the edge sensor 5.

Meanwhile, as shown in (b) of FIG. 3, when the upper cover part 41 is struck from the lateral direction, due to the catching between the stopper 46 and the wall surface of the recess part 21*e* (the outer peripheral surface of the bent part 21*b*), the deformation (displacement) of the upper cover part 41 toward the inner peripheral side is limited. By limiting the deformation of the upper cover part 41 toward the inner peripheral side, the contact of the upper cover part 41 and the lateral cover part 42 to the outer edge portion of the sensor installation part 21*d* can be suppressed. Therefore, the protrusion 45 can be easily suppressed to the edge sensor 5. Accordingly, the sensitivity of the edge sensor 5 with respect to the striking from the lateral direction can be facilitated.

In addition, in the pre-striking state (the state of FIG. 2), the stopper 46 faces the space S1, and there is no rubber filling the space S1 on the outer peripheral side of the stopper 46. Therefore, the upper cover part 41 is easily deformed to bend with the root portion of the stopper 46 as the start point. Accordingly, for example, even in the case where the outer edge portion of the upper cover part 41 is struck lightly from the lateral direction (see (b) of FIG. 3), the protrusion 45 is easily pressed to the edge sensor 5. Accordingly, the sensitivity of the edge sensor 5 with respect to the striking from the lateral direction can be facilitated.

Moreover, with the deformation of the upper cover part 41 toward the inner peripheral side being limited by the stopper 46, the force applied to the bonding portion (the double-side tape 6) between the covered part 21*a* and the upper cover part 41 can be reduced. Accordingly, the upper cover part 41 can be prevented from being peeled off from the covered part 21*a*.

In addition, a bonding position P1 between the bonding part 44 and the lower surface of the bow frame 21 is located on the inner peripheral side with respect to the stopper 46, and neither of the lateral cover part 42 and the lower cover part 43 is bonded to the bow frame 21 on the outer peripheral side with respect to the bonding position P1. Accordingly, in both (referred to as "striking from the respective directions" in the following) of the normal striking (see (a) of FIG. 3) and the striking from the lateral direction (see (b) of FIG. 3), the lateral cover part 42 and the lower cover part 43 easily follow the deformation of the upper cover part 41 with the stopper 46 as the fulcrum. That is, the deformation of the upper cover part 41 can be prevented from being obstructed by the lateral cover part 42 and the lower cover part 43. Therefore, the protrusion 45 is easily pressed to toward the edge sensor 5. Accordingly, the sensitivity of the edge sensor 5 with respect to the striking from the respective directions can be facilitated.

In addition, although the lower cover part 43 is also deformed at the time of being struck from the lateral direction, the deformation of the lower cover part 43 is limited by a protrusion part 21*f*. The protrusion part 21*f* protrudes downward from the lower surface of the bow frame 21, and the bonding part 44 is inserted between a protrusive portion formed by the bent part 21*b*, the overhang part 21*c*, and the sensor installation part 21*d* on the lower surface of the bow frame 21 and the protrusion part 21*f*.

Accordingly, since the deformation of the lower cover part 43 and the bonding part 44 toward the inner peripheral side at the time of being struck from the lateral direction (see (b) of FIG. 3) is limited by the protrusion part 21*f*, the upper cover part 41 and the lateral cover part 42 can be suppressed from contacting the outer edge portion of the sensor installation part 21*d*. Thus, since the protrusion 45 is easily pressed to the edge sensor 5, the sensitivity of the edge sensor 5 with respect to the striking from the lateral direction can be facilitated. Moreover, by limiting the deformation the lower cover part 43 and the bonding part 44 toward the inner peripheral side by the protrusion part 21*f*, the force applied to the bonding position P1 between the bow frame 21 and the bonding part 44 can be reduced, and the bonding part 44 can be suppressed from being peeled off from the bow frame 21.

In addition, in order to easily deform the upper cover part 41 by setting the stopper 46 as the fulcrum, a thin part 47 is formed at the upper cover part 41. More specifically, except for regions in which the protrusion 45 and the thin part 47 are formed, the thickness of the upper cover part 41 is substantially constant in regions on the outer peripheral side with respect to the stopper 46. Here, "being substantially constant" means that, compared with the averaged thickness of the upper cover part 41 in such regions, the minimum thickness and the maximum thickness of the upper cover part 41 are within ±10% of the averaged thickness. Meanwhile, in the region in which the thin part 47 is formed, the thickness of the upper cover part 41 is thinner than other regions, and the thickness of the upper cover part 41 is gradually reduced toward the stopper 46.

By forming such thin part 47 in an adjacent portion to the outer peripheral surface of the stopper 46, at the time of being struck from the respective directions (see (a) and (b) of FIG. 3), the upper cover part 41 is easily deformed with the root portion of the stopper 46 as the start point. Accordingly, for example, even in the case where the outer edge portion of the upper cover part 41 is struck lightly, the sensitivity of the edge sensor 5 with respect to the striking from the respective directions can be facilitated.

Figure 4:
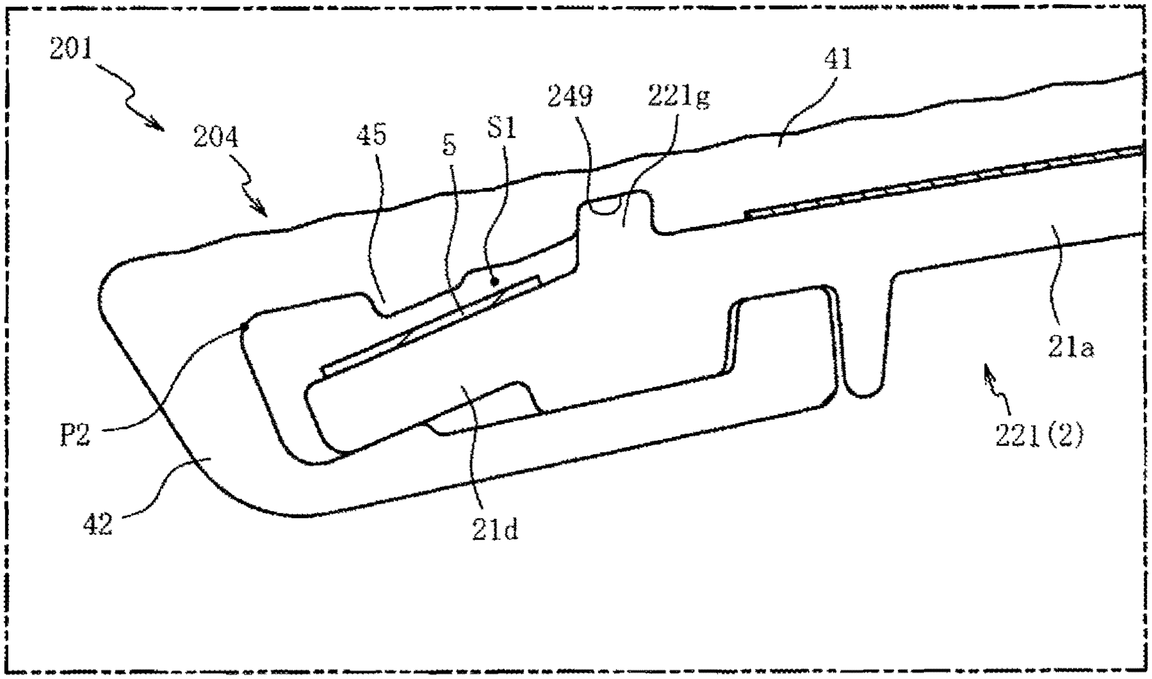
In FIG. 4, (a) is a cross-sectional view illustrating an electronic cymbal according to a second embodiment, and (b) is a cross-sectional view illustrating an electronic cymbal according to a third embodiment.
Figure 4:
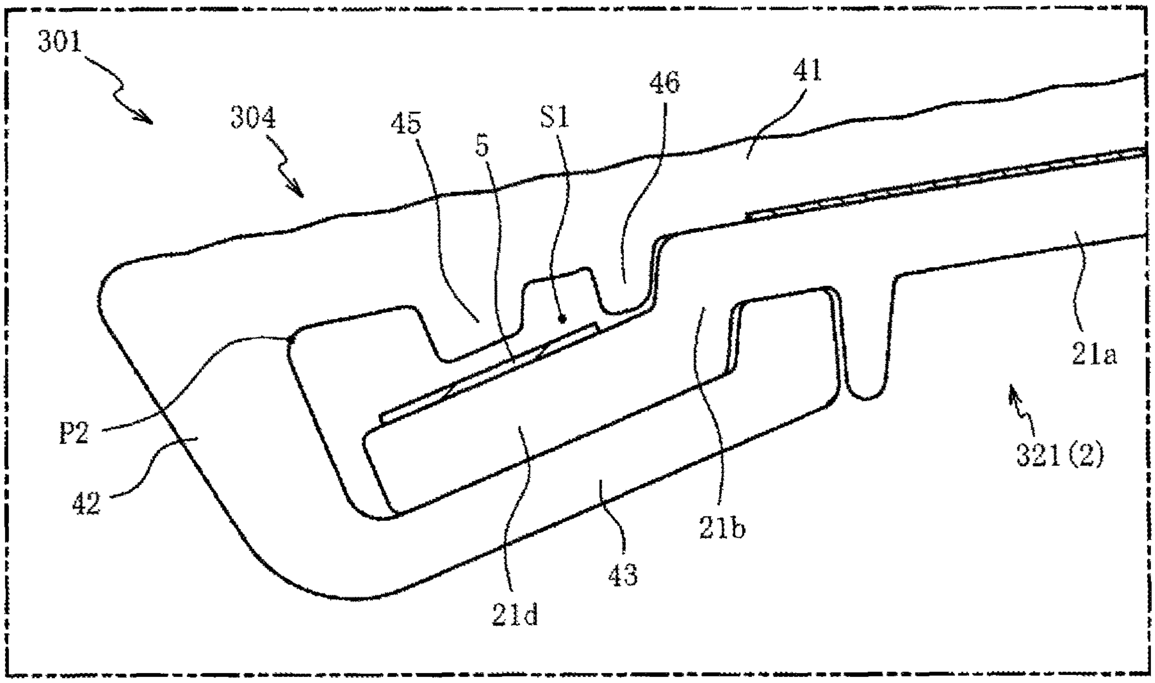

In this way, although the deformation of the upper cover part 41 toward the inner peripheral side is limited by the stopper 46 formed at the upper cover part 41 in the embodiment, the deformation of the upper cover part 41 toward the inner peripheral side can also be limited even in a configuration in which a stopper 221*g* protruding upward from a bow frame 221 is fit to a recess part 249 of a cover 204 in a second embodiment (see (a) of FIG. 4) to be described in the following, for example. However, in such configuration, since the thickness of the region of the cover 204 where the recess part 249 is formed is reduced, the cover 204 is less durable with respect to striking. When the thickness of the cover 204 is increased to ensure the durability, the overall thickness of the electronic cymbal 201 is increased, and it is difficult to keep the shape flat like the cymbal.

Comparatively, in the embodiment, it is configured that the bent part 21*b* bent downward from the outer edge of the covered part 21*a* is formed at the bow frame 21, the stopper 46 located on the outer peripheral side of the bent part 21*b* is formed at the upper cover part 41, and the deformation of the upper cover part 41 toward the inner peripheral side is limited by the bent part 21*b* and the stopper 46. Accordingly, compared with the configuration in which the stopper 221*g* of the bow frame 221 is inserted into the recess part 249 of the cover 204 as in the second embodiment, the thickness of the cover 4 is ensured, and the overall thickness of the bow frame 21 and the cover 4 can be reduced. Accordingly, the electronic cymbal 1 can be in a shape similar to the cymbal.

Here, the deformation of the upper cover part 41 toward the inner peripheral side can be generally limited by the stopper 46. However, at the time of being struck strongly from the lateral direction, for example, the protrusion 45 of the upper cover part 41 is displaced toward the inner peripheral side (the inner side along the left-right direction) instead of being displaced downward. In the case where the protrusion 45 is displaced toward the inner peripheral side, the closer the angle of the upper surface of the sensor installation part 21*d* (the edge sensor 5) is to being horizontal, the more likely the edge sensor 5 is pressed insufficiently by the protrusion 45.

Comparatively, in the embodiment, the upper surface of the sensor installation part 21*d* (the edge sensor 5) and the lower surface of the protrusion 45 are formed to be parallel, and the respective surfaces tilt downward toward the outer peripheral side at a slope greater than that of the upper surface of the covered part 21*a*. Accordingly, a larger angle of the upper surface of the sensor installation part 21*d* (the edge sensor 5) with respect to the left-right direction (horizontal direction) can be ensured. Thus, even in the case where the protrusion 45 is displaced toward the inner peripheral side due to the striking from the lateral direction, the edge sensor 5 is easily pressed by the protrusion 45. Therefore, the sensitivity of the edge sensor 5 with respect to the striking from the lateral direction can be facilitated.

In addition, the slope of the upper surface of the sensor installation part 21*d* is greater than that of the upper surface of the covered part 21, whereas the lower surface of the upper cover part 41 (the portion without the protrusion 45 and the thin part 47) is parallel to the upper surface of the covered part 21*a*. That is, the lower surface of the upper cover part 41 tilts downward toward the outer peripheral side at a slope less than that of the upper surface of the sensor installation part 21*d*.

Accordingly, an interval between the upper surface of the sensor installation part 21*d* and the lower surface of the upper cover part 41 is gradually increased from the inner peripheral side to the outer peripheral side. Therefore, a connection position P2 between the upper cover part 41 and the lateral cover part 42 can be away from the outer edge of the sensor installation part 21*d*. Thus, at the time of being struck from the lateral direction, the upper cover part 41 and the lateral cover part 42 can be suppressed from contacting the outer edge portion of the sensor installation part 21*d*. Accordingly, since the protrusion 45 is easily pressed to the edge sensor 5, the sensitivity of the edge sensor 5 with respect to the striking from the lateral direction can be facilitated.

In this way, in the embodiment, by limiting the deformation of the upper cover part 41 toward the inner peripheral side by the stopper 46, or by increasing the slope of the upper surface of the sensor installation part 21*d* (the edge sensor 5), the sensitivity of the edge sensor 5 with respect to the striking from the lateral direction can be facilitated.

Comparatively, referring to a third embodiment (see (b) of FIG. 4) to be described afterwards, for example, even in a configuration in which the overhang part 21*c* is omitted, and the sensor installation part 21*d* is provided at the lower end of the bent part 21*b*, it is still possible to exert the function of the stopper 46. However, in the configuration in which the sensor installation part 21*d* with a larger slope is connected to the lower part of the bent part 21*b*, the sensor installation part 21*d* significantly protrudes downward from the bow frame 21. That is, since the thickness of the edge portion of the bow frame 21 is increased, it is difficult to keep the shape of an electronic cymbal 301 flat like the cymbal.

Comparatively, in the embodiment, it is configured that the overhang part 21*c* which overhangs from the lower end of the bent part 21*b* toward the outer peripheral side is provided, and the sensor installation part 21*d* is provided at the upper end part on the outer edge side of the overhang part 21*c*. In this way, compared with the configuration in which the overhang part 21*c* is omitted, the arrangement (height) of the sensor installation part 21*d* can be increased. Therefore, the significant downward protrusion of the sensor installation part 21*d* can be suppressed. Accordingly, the thickness of the edge portion of the bow frame 21 can be reduced, and the electronic cymbal 1 can be in a flat shape like the cymbal.

Here, in addition to the function of detecting the striking to the upper cover part 41, the edge sensor 5 is also provided with a function of detecting a choke playing technique in which the performer grabs the edge portion of the bow frame 21. A conventional process may be adopted for the process of distinguishing between the striking to the upper cover part 41 and the choke playing technique. Therefore, details in this regard will be omitted. As a conventional process, a process described in para. 0005 to 0008 of Japanese Laid-open No. H06-035450, etc., may serve as an example.

In such choke playing technique, as described above, the performer grabs the edge portion of the bow frame 21. In such case, when the sensor installation part 21*d* is provided at the upper end part on the outer edge side of the overhang part 21*c*, a step difference is formed in the connection portion between the overhang part 21*c* and the sensor installation part 21*d*, and a space S2 (see FIG. 2) is created between the step difference portion and the lower cover part 43. Therefore, the feeling when performing the choke playing technique deteriorates. That is, when the space S2 is formed to be large, a hard feeling like the cymbal cannot be obtained.

Comparatively, the lower cover part 43 of the embodiment includes a contact part 48 which fills a portion of the step difference formed by the overhang part 21*c* and the sensor installation part 21*d*. The contact part 48 is a protrusion integrally formed with the upper surface of the lower cover part 43, and contacts the lower surface of the sensor installation part 21*d* in the pre-striking state (the state shown in (a) and (b) of FIG. 2). Accordingly, when the performer grabs the vicinity of the contact part 48 to perform the choke playing technique, a relatively hard feeling can be applied, so the electronic cymbal can provide a feeling of performance close to the cymbal.

To provide the hard feeling close to the cymbal, the space S2 may be completely filled by the contact part 48. However, when the space S2 is completely filled by the contact part 48, due to a dimension error of the frame 2 or the cover 4, it is difficult to properly fit the contact part 48 to the step difference portion between the overhang part 21*c* and the sensor installation part 21*d*. In addition, when the space S2 is completely filled by the contact part 48, the deformation of the upper cover part 41 is obstructed by the catching between the overhang part 21*c* and the contact part 48, and it is difficult to press the protrusion 45 to the edge sensor 5.

Comparatively, in the embodiment, a gap is formed between the overhang part 21*c* and the contact part 48, and a portion of the space S2 is left. Accordingly, even if a dimension error occurs in the frame 2 or the cover 4, the contact part 48 can still be properly fit to the step difference portion between the overhang part 21*c* and the sensor installation part 21*d*. Therefore, the assemblability of the cover 4 can be facilitated. Moreover, since the space S2 is left, at the time of being struck from the respective directions (see (a) and (b) of FIG. 3), the contact part 48 can be suppressed from being caught by the overhang part 21*c*. Therefore, the upper cover part 41 is deformed easily with the stopper 48 as the fulcrum. Thus, since the protrusion 45 is easily pressed to the edge sensor 5, the sensitivity of the edge sensor 5 with respect to the striking from the respective directions can be facilitated.

In addition, as described above, although the stopper 46 is inserted into the recess part 21*e*, a gap is also formed between stopper 46 and the wall surface on the outer peripheral side of the recess part 21*e* (the sensor installation part 21*d*) in the pre-striking state. Accordingly, even if a dimension error occurs in the frame 2 or the cover 4, the stopper 46 can be properly inserted into the recess part 21*e*. Therefore, the assemblability of the cover 4 can be facilitated.

Then, the electronic cymbal 201 of the second embodiment is described with reference to (a) of FIG. 4. In the first embodiment, the case where the stopper 46 is formed in the cover 4 is described. However, in the second embodiment, the case where the stopper 221*g* is formed at the bow frame 221 is described. It is noted that components same as those of the first embodiment are labelled with the same reference symbols, and the description thereof is omitted. In FIG. 4, (a) is a partially enlarged cross-sectional view of the electronic cymbal 201 according to the second embodiment. In (a) of FIG. 4, in order to simplify the drawing, the hatching of the frame 2 (the bow frame 221) and the cover 204 is omitted.

As shown in (a) of FIG. 4, the bow frame 221 of the electronic cymbal 201 of the second embodiment has the same configuration as the bow frame 21 of the first embodiment, except for the point where, in place of the recess part 21*e* of the first embodiment (see FIG. 2), the stopper 221*g* is integrally formed. Also, the cover 204 has the same configuration as the cover 4 of the first embodiment except for a point that, in place of the stopper 46 of the first embodiment (see FIG. 2), the recess part 249 is formed at the upper cover part 41.

The stopper 221*g* protrudes upward from the bow frame 221, and is inserted into the recess part 249 formed on the lower surface of the upper cover part 41. Accordingly, at the time of being struck from the lateral direction, through the catching between the stopper 221*g* and the recess part 249, the deformation of the upper cover part 41 toward the inner peripheral side can be limited. Thus, since the upper cover part 41 and the lateral cover part 42 can be suppressed from contacting the sensor installation part 21*d* at the time of being struck from the lateral direction, the protrusion 45 is easily pressed to the edge sensor 5.

Also, in the pre-striking state (the state of (a) of FIG. 4), the stopper 221*g* faces the space S1 between the sensor installation part 21*d* and the upper cover part 41, and there is no rubber filling the outer peripheral side of the stopper 221*g*. Accordingly, the upper cover part 41 is easily deformed with the stopper 221*g* as the fulcrum, and thus the protrusion 45 is easily pressed to the edge sensor 5 at the time of being struck from the respective directions.

Also, like the first embodiment, the upper surface of the sensor installation part 21*d* (the edge sensor 5) and the lower surface of the protrusion 45 are formed to be parallel, and the angles of the respective surfaces provide slopes greater than the upper surface of the covered part 21*a*. Accordingly, the angle of the upper surface of the sensor installation part 21*d* (the edge sensor 5) with respect to the horizontal direction can be increased. Thus, even if the protrusion 45 is displaced toward the inner peripheral side due to the striking from the lateral direction, the edge sensor 5 is easily pressed by the protrusion 45.

In addition, since an interval between the sensor installation part 21*d* and the upper cover part 41 is gradually increased toward the outer peripheral side, the connection position P2 between the upper cover part 41 and the lateral cover part 42 can be away from the outer edge of the sensor installation part 21*d*. Thus, since the upper cover part 41 and the lateral cover part 42 can be suppressed from contacting the sensor installation part 21*d* at the time of being struck from the lateral direction, the protrusion 45 is easily pressed to the edge sensor 5. Accordingly, the sensitivity of the edge sensor 5 with respect to the striking from the lateral direction can be facilitated.

Then, an electronic cymbal 301 of the third embodiment is described with reference to (b) of FIG. 4. In the first embodiment, the case where the sensor installation part 21*d* is connected to the overhang part 21*c* is described. However, in the third embodiment, the case where the sensor installation part 21*d* is connected to the lower end of the bent part 21*b* is described. In FIG. 4, (b) is a partially enlarged cross-sectional view of the electronic cymbal 301 according to the third embodiment. In (b) of FIG. 4, in order to simplify the drawing, the hatching of the frame 2 (a bow frame 321) and a cover 304 is omitted.

As shown in (b) of FIG. 4, the bow frame 321 of the electronic cymbal 301 of the third embodiment has the same configuration as the bow frame 21 of the first embodiment, except for the point that the overhang part 21*c* of the first embodiment (see FIG. 2) is omitted, and the sensor installation part 21*d* is integrally formed at the lower end of the bent part 21*b*.

In addition, the cover part 304 has the same configuration as the cover 4 of the first embodiment, except for the point that the upper cover part 41 (a portion on the outer peripheral side with respect to the stopper 46) or the protrusion 45 is formed to be thicker and the point that the lower cover part 43 omitting the contact part 48 (see FIG. 2) makes contact along the lower surface of the sensor installation part 21*d*.

Even in the embodiment, due to the catching between the stopper 46 and the bent part 21*b*, the deformation of the upper cover part 41 toward the inner peripheral side can be limited at the time of being struck from the lateral direction. In this way, since the upper cover part 41 and the lateral cover part 42 can be suppressed from contacting the outer edge portion of the sensor installation part 21*d* at the time of being struck from the lateral direction, the protrusion 45 is easily pressed to the edge sensor 5.

In addition, in the pre-striking state (the state of (b) of FIG. 4), the stopper 46 faces the space S1 between the sensor installation part 21*d* and the upper cover part 41, and there is no rubber filling the outer peripheral side of the stopper 46. Accordingly, since the upper cover part 41 is easily deformed with the stopper 46 as the fulcrum, the protrusion 45 is easily pressed to the edge sensor 5 at the time of being struck from the respective directions.

Also, like the first embodiment, the upper surface of the sensor installation part 21*d* (the edge sensor 5) and the lower surface of the protrusion 45 are formed to be parallel, and the angles of the respective surfaces provide slopes greater than the upper surface of the covered part 21*a*. Accordingly, a larger angle of the upper surface of the sensor installation part 21*d* (the edge sensor 5) with respect to the horizontal direction can be ensured, and thus even if the protrusion 45 is displaced toward the inner peripheral side due to the striking from the lateral direction, the edge sensor 5 is easily pressed by the protrusion 45.

In addition, since an interval between the sensor installation part 21*d* and the upper cover part 41 is gradually increased toward the outer peripheral side, the connection position P2 between the upper cover part 41 and the lateral cover part 42 can be away from the outer edge of the sensor installation part 21*d*. Thus, since the upper cover part 41 and the lateral cover part 42 can be suppressed from contacting the sensor installation part 21*d* at the time of being struck from the lateral direction, the protrusion 45 is easily pressed to the edge sensor 5. Accordingly, the sensitivity of the edge sensor 5 with respect to the striking from the lateral direction can be facilitated.

Although the above description has been made based on the embodiments, the invention is not limited to the embodiments, and it can be easily inferred that various improvements and modifications can be made without departing from the spirit of the invention.

In the respective embodiments, a configuration in which the frame 2 includes the disc-shaped bell frame 20 and the bow frame 21, 221, and 321, that is, the case in which the electronic cymbal 1, 201, 301 is an electronic percussion instrument simulating the cymbal, is described. However, the invention is not limited thereto. For example, the invention may also be applicable to an edge portion of another disc-shaped electronic percussion instrument. In addition, the outer shape of the frame 2 is not limited to being circular (disc-shaped). For example, the outer shape of the frame 2 may also be polygonal.

In the respective embodiments, the case where the lower surface of the protrusion 45 of the upper cover part 41 is parallel to the upper surface of the sensor installation part 21*d* (the edge sensor 5) is described. However, the invention is not limited thereto. For example, the slope of the lower surface of the protrusion 45 may also be configured as being greater or less than that of the upper surface of the sensor installation part 21*d* (the edge sensor 5), and the protrusion 45 may also be omitted.

In the respective embodiments, the case where the slope of the upper surface of the sensor installation part 21*d* (the edge sensor 5) is greater than the upper surface of the covered part 21*a* is described. However, the invention is not limited thereto. For example, the slope of the upper surface of the sensor installation part 21*d* may also be configured as being the same as or less than the slope of the upper surface of the covered part 21*a*.

In the respective embodiments, the configuration in which the interval between the sensor installation part 21*d* (the edge sensor 5) and the upper cover part 41 is gradually increased is described. However, the invention is not limited thereto. For example, the interval between the sensor installation part 21*d* (the edge sensor 5) and the upper cover part 41 may also remain the same or be gradually decreased from the inner peripheral side to the outer peripheral side.

In the respective embodiments, the case where the bonding position P1 between the bow frame 21, 221, 321 and the bonding part 44 is located on the inner peripheral side with respect to the stopper 46, 221*g* is described. However, the invention is not limited thereto. For example, the bonding position P1 may also be located on the outer peripheral side with respect to the stopper 46, 221*g*, the bonding part 44 may be omitted, and the inner edge of the lower cover part 43 is directly bonded to the lower surface of the bow frame 21, 221, 321.

In the respective embodiments, the case where the upper cover part 41 or the bow frame 221 (the frame 2) includes the stopper 46, 221*g* limiting the deformation of the upper cover part 41 toward the inner peripheral side is described. However, the invention is not limited thereto. For example, the stopper 46, 221*g* may be omitted.

In the first and second embodiments, a portion of the step difference portion (the space S2) between the overhang part 21*c* and the sensor installation part 21*d* is filled by the contact part 48. However, the invention is not limited thereto. For example, the contact part 48 may also completely fill the step difference portion (the space S2), or the contact part 48 may also be omitted.

Although omitted in the description of the first and third embodiments, the stopper 46 may contact the wall surface (the outer peripheral surface of the bent part 21*b*) of the recess part 21*e* in the pre-striking state. However, the wall surface (the outer peripheral surface of the bent part 21*b*) on the inner peripheral side of the recess part 21*e* and the stopper 46 may be separated from the stopper 46 as long as the pressing to the edge sensor 5 by the protrusion 45 does not become insufficient.

Although the first embodiment describes the case where a gap is formed between the sensor installation part 21*d* and the stopper 46, the invention is not limited thereto. For example, the sensor installation part 21*d* and the stopper 46 may also be connected with each other in the pre-striking state.

The first embodiment describes the case where the thickness of the upper cover part 41 in the thin part 47 is gradually reduced toward the stopper 46, but the invention is not limited thereto. For example, the thickness of the upper cover part 41 in the thin part 47 may also be constant. In addition, it may also be that the thin part 47 is omitted, and the thickness of the upper cover part 41 (the region where the protrusion 45 or the stopper 46 is not formed) may also remain constant. That is, if it is configured that the upper cover part 41 (the protrusion 45) can be deformed to the side of the edge sensor 5 by the stopper 46 as the fulcrum, the thickness of the upper cover part 41 can be set as appropriate.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic cymbal, comprising:
- a plate-like frame;
- a sensor installed to an upper surface on an outer edge side of the frame; and
- a cover covering upper surfaces of the sensor and the frame, wherein the cover comprises:
- an upper cover part covering the upper surface of the frame in a state in which a space is formed between the upper cover part and the sensor;
- a lateral cover part extending from an outer edge of the upper cover part and covering an outer peripheral surface of the frame in a state in which a space is formed between the lateral cover part and an outer peripheral surface of the frame; and
- a lower cover part extending from a lower end of the lateral cover part to an inner peripheral side and covering a lower surface of the frame, the upper cover part or the frame comprises a stopper facing the space between the upper cover part and the sensor and limits deformation of the upper cover part toward the inner peripheral side, the upper cover part comprises a protrusion which protrudes toward the sensor, and the frame comprises:
- a covered part covered in a state of being contacted by the upper cover part; and
- a bent part bent downward from an outer edge of the covered part, wherein the stopper is disposed next to the bent part, so that a sidewall of the stopper is in contact with a sidewall of the bent part in response to a striking.

2. The electronic cymbal as claimed in claim 1, wherein the upper cover part is bonded to the upper surface of the frame on an inner peripheral side of the stopper.

3. The electronic cymbal as claimed in claim 1, wherein the lower cover part is bonded to the lower surface of the frame on the inner peripheral side with respect to the stopper, and is not bonded to the lower surface of the frame on an outer peripheral side with respect to a position of the bonding.

4. The electronic cymbal as claimed in claim 1, wherein the upper cover part comprises a thin part formed in an adjacent portion to an outer peripheral surface of the stopper.

5. The electronic cymbal as claimed in claim 1, wherein the frame comprises:

the upper cover part comprises the stopper protruding toward the frame on an outer peripheral side of the bent part, and the deformation of the upper cover part toward the inner peripheral side is limited through catching between the bent part and the stopper.

6. The electronic cymbal as claimed in claim 5, wherein the frame comprises:
- an overhang part extending from a lower end of the bent part to an outer peripheral side; and
- a sensor installation part which extends from an upper end part on an outer edge side of the overhang part to the outer peripheral side and to which the sensor is installed, the upper cover part comprises the protrusion which protrudes toward the sensor and in which a lower surface is parallel to an upper surface of the sensor installation part, and the upper surface of the sensor installation part tilts downward toward the outer peripheral side at a slope greater than that of an upper surface of the covered part.

7. The electronic cymbal as claimed in claim 6, wherein the lower cover part comprises a contact part contacting a lower surface of the sensor installation part in a manner of filling at least a portion of a step difference formed by the overhang part and the sensor installation part.

8. The electronic cymbal as claimed in claim 7, wherein a gap is formed between the overhang part and the contact part.

9. The electronic cymbal as claimed in claim 6, wherein a gap is formed between the stopper and the sensor installation part.

10. The electronic cymbal as claimed in claim 7, wherein a gap is formed between the stopper and the sensor installation part.

11. The electronic cymbal as claimed in claim 8, wherein a gap is formed between the stopper and the sensor installation part.

12. The electronic cymbal as claimed in claim 1, wherein the frame comprises:

a sensor installation part which is located on an outer peripheral side with respect to the covered part and to which the sensor is installed, and the upper surface of the sensor installation part tilts downward toward an outer peripheral side at a slope greater than that of an upper surface of the covered part, and an interval between the upper surface of the sensor installation part and the lower surface of the upper cover part is formed to gradually increase toward the outer peripheral side.

13. The electronic cymbal as claimed in claim 12, wherein the frame comprises:

the upper cover part comprises the stopper protruding toward the frame on an outer peripheral side of the bent part and faces the space between the upper cover part and the sensor, and the deformation of the upper cover part toward the inner peripheral side is limited through catching between the bent part and the stopper.

14. The electronic cymbal as claimed in claim 13, wherein the frame comprises:

an overhang part extending from a lower end of the bent part to an outer peripheral side, and the sensor installation part which extends from an upper end part on an outer edge side of the overhang part to the outer peripheral side.

15. The electronic cymbal as claimed in claim 14, wherein the lower cover part comprises a contact part contacting a lower surface of the sensor installation part in a manner of filling at least a portion of a step difference formed by the overhang part and the sensor installation part.

16. The electronic cymbal as claimed in claim 15, wherein a gap is formed between the overhang part and the contact part.

17. The electronic cymbal as claimed in claim 14, wherein a gap is formed between the stopper and the sensor installation part.

18. The electronic cymbal as claimed in claim 15, wherein a gap is formed between the stopper and the sensor installation part.

19. A striking detection method for an electronic cymbal, wherein the electronic cymbal comprises:

a plate-like frame;

a sensor installed to an upper surface on an outer edge side of the frame; and a cover covering upper surfaces of the sensor and the frame, the cover comprises:

an upper cover part covering the upper surface of the frame in a state in which a space is formed between the upper cover part and the sensor;

a lateral cover part extending from an outer edge of the upper cover part and covering an outer peripheral surface of the frame in a state in which a space is formed between the lateral cover part and an outer peripheral surface of the frame; and a lower cover part, extending from a lower end of the lateral cover part to an inner peripheral side and covering a lower surface of the frame, the upper cover part or the frame comprises a stopper facing the space between the upper cover part and the sensor, the upper cover part comprises a protrusion which protrudes toward the sensor, the frame comprises:

a covered part covered in a state of being contacted by the upper cover part; and a bent part bent downward from an outer edge of the covered part, wherein the stopper is disposed next to the bent part, so that a sidewall of the stopper is in contact with a sidewall of the bent part in response to a striking, and the striking detection method comprises:

at the time of striking an outer edge of the cover, limiting deformation of the upper cover part toward the inner peripheral side by the stopper, and detecting striking to the cover by pressing the sensor by the upper cover part deformed with the stopper as a fulcrum.

20. The striking detection method as claimed in claim 19, wherein the frame comprises:

a sensor installation part which is located on an outer peripheral side with respect to the covered part and to which the sensor is installed, the upper surface of the sensor installation part tilts downward toward an outer peripheral side at a slope greater than that of an upper surface of the covered part, and an interval between the upper surface of the sensor installation part and the lower surface of the upper cover part is formed to gradually increase toward the outer peripheral side, and the striking detection method further comprises:

at the time of striking the outer edge of the cover, suppressing the upper cover part and the lateral cover part from contacting an outer edge of the sensor installation part, and detecting striking to the cover by pressing the sensor by the protrusion displaced together with deformation of the upper cover part.

* * * * *